United States Patent
Shin (10) Patent No.: US 9,509,523 B2
(45) Date of Patent: Nov. 29, 2016

(54) METHOD FOR PROTECTION SWITCHING IN ETHERNET RING NETWORK

(75) Inventor: Dong-Chel Shin, Seongnam-si (KR)

(73) Assignee: DASAN NETWORKS, INC., Seongnam-si (KR)

( * ) Notice: Subject to any disclaimer, the term of this patent is extended or adjusted under 35 U.S.C. 154(b) by 783 days.

(21) Appl. No.: 13/448,626

(22) Filed: Apr. 17, 2012

(65) Prior Publication Data

US 2013/0250753 A1    Sep. 26, 2013

(30) Foreign Application Priority Data

Mar. 26, 2012  (KR) .................. 10-2012-0030696

(51) Int. Cl.
| | |
|---|---|
| *H04L 12/437* | (2006.01) |
| *H04L 12/751* | (2013.01) |
| *H04L 12/24* | (2006.01) |
| *H04L 12/701* | (2013.01) |
| *H04L 12/707* | (2013.01) |
| *H04L 12/703* | (2013.01) |

(52) U.S. Cl.
CPC ............. *H04L 12/24* (2013.01); *H04L 12/437* (2013.01); *H04L 45/00* (2013.01); *H04L 45/22* (2013.01); *H04L 45/28* (2013.01)

(58) Field of Classification Search
CPC ...... H04L 12/437; H04L 45/02; H04L 47/13
USPC ....................................................... 370/222
See application file for complete search history.

(56) References Cited

U.S. PATENT DOCUMENTS

| 8,018,841 | B2 * | 9/2011 | Holness et al. ............... 370/222 |
| 8,031,590 | B2 * | 10/2011 | Long ..................... H04L 12/437 370/225 |
| 8,203,932 | B2 | 6/2012 | Cheung et al. |
| 8,453,050 | B2 * | 5/2013 | Dias et al. ..................... 715/239 |
| 8,737,198 | B1 * | 5/2014 | Holness .................. H04L 45/28 370/222 |
| 2005/0243823 | A1 * | 11/2005 | Griswold et al. ............. 370/389 |
| 2009/0147672 | A1 * | 6/2009 | Chun .................... H04L 12/437 370/225 |
| 2009/0296569 | A1 * | 12/2009 | Ramalho Ribeiro Dos Santos .................. H04L 12/437 370/222 |
| 2010/0296416 | A1 * | 11/2010 | Lee ..................... H04L 12/4637 370/258 |
| 2011/0040898 | A1 * | 2/2011 | Kim et al. .................... 709/251 |
| 2011/0122762 | A1 * | 5/2011 | Wu ...................... H04L 12/437 370/218 |
| 2011/0292833 | A1 * | 12/2011 | Kapitany et al. ............. 370/254 |
| 2012/0243405 | A1 * | 9/2012 | Holness et al. ............... 370/225 |
| 2013/0064071 | A1 * | 3/2013 | Bos et al. ..................... 370/223 |
| 2013/0343179 | A1 * | 12/2013 | Madaiah ............... H04L 12/437 370/222 |

FOREIGN PATENT DOCUMENTS

| KR | 2003-0057590 | 7/2003 |
| KR | 10-0929574 | 11/2009 |
| KR | 10-0954595 B1 | 4/2010 |
| KR | 10-2010-0062835 | 6/2010 |
| KR | 10-0968939 | 7/2010 |

OTHER PUBLICATIONS

Recommendation ITU-T G.8032/Y.1344, "Ethernet ring protection switching", posted Aug. 30, 2010, pp. 1-98.*
Ryoo et al., "Ethernet Ring Protection for Carrier Ethernet Networks", archived Oct. 27, 2011, pp. 1-14.*

* cited by examiner

Primary Examiner — Scott M Sciacca (57) ABSTRACT

A method for protection switching in an Ethernet ring network is provided. According to an aspect, the protection switching method includes: at a first node on the Ethernet ring network, detecting link failure; at the first node, determining whether a port through which a protection switching message has to be transmitted is on a forwarding path; and at the first node, generating a protection switching message based on the result of the determination; and at the first node, transmitting the protection switching message.

7 Claims, 6 Drawing Sheets

| 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|
| 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 |
| Request /State | | | Reserved 1 | | | | | R B | D N F | Status | | | | | Status Reserved | | | | | | | | Node ID (6 octets) | | | | | | | | |
| (Node ID) | | | | | | | | | | | | | | | | | | | | | | | | | | | | | | | |
| Reserved 2 (24 octets) | | | | | | | | | | | | | | | | | | | | | | | | | | | | | | | |

METHOD FOR PROTECTION SWITCHING IN ETHERNET RING NETWORK

CROSS-REFERENCE TO RELATED APPLICATION

This application claims the benefit under 35 U.S.C. §119(a) of a Korean Patent Application No. 10-2012-0030696, filed on Mar. 26, 2012, the entire disclosure of which is incorporated herein by reference for all purposes.

BACKGROUND

1. Field

The following description relates to a method for protection switching in an Ethernet ring network, and more particularly, to a technique of selectively flushing a Filtering DataBase (FDB) by setting a Do Not Flush (DNF) bit of a protection switching message as necessary when a failed link is found.

2. Description of the Related Art

Since the G.8032 Ethernet protection system allows no loop of Ethernet rings, the G.8032 Ethernet protection system defines a logically blocked link called a Ring Protection Link (RPL) to logically block RPL ports. In a multi-ring where many rings connect to each other, each ring forms a bus phase and the entire network forms a tree phase. An RPL owner node periodically transmits a control message to a ring to which the RPL owner node belongs to inform that the network is in a stable state, and each node creates a Filtering DataBase (FDB) which is a forwarding table suitable for a phase configured with the blocked RPL ports.

If failure occurs in a specific ring, the blocked RPL ports are unblocked, and FDB information suitable for the changed network phase is reconfigured. In other words, nodes adjacent to a ring where failure has occurred block the corresponding ports and transmit Signal Failure (SF) messages to the neighboring nodes. The neighboring nodes that have received the SF messages flush their own FDB information, a RPL owner node unblocks the blocked RPL ports and thereafter, the nodes collect forwarding information suitable for a new phase using a MAC Source Address Learning Mechanism defined in an Ethernet bridge standard to thereby create FDBs.

However, since the nodes that have received the SF messages flush their own FDBs, the existing forwarding tables become disabled and accordingly all the nodes need new forwarding tables. Accordingly, the nodes should again start MAC source address learning. However, such frequent MAC source address learning causes a traffic overshoot in the network.

SUMMARY

The following description relates to a protection switching method for minimizing a traffic overshoot by selectively flushing, when failure has occurred in an Ethernet link, Filtering Databases (FDBs) of nodes or parts of addresses stored in FDBs in consideration of whether or not the failed link influences data forwarding.

In one general aspect, there is provided a method for protection switching in an Ethernet ring network, including: at a first node on the Ethernet ring network, detecting link failure; at the first node, determining whether a port through which a protection switching message has to be transmitted is on a forwarding path; and at the first node, generating a protection switching message based on the result of the determination; and at the first node, transmitting the protection switching message.

The generating of the protection switching message may set a Do Not Flush (DNF) bit of the protection switching message if the port through the protection switching message has to be transmitted is not on the forwarding path.

The method may further include: at a second node on the Ethernet ring network, receiving the protection switching message; at the second node, checking the DNF bit of the protection switching message; and at the second node, flushing, if the DNF bit has been reset, a Filtering DataBase (FDB).

The flushing of the FDB may include flushing only an address corresponding to a port through which the protection switching message has been received, from the FDB.

The flushing of the FDB may flush the FDB in a predetermined hardware manner.

In another general aspect, there is provided a method for protection switching in an Ethernet ring network, including: at an uplink node on the Ethernet ring network, receiving a protection switching message; at the uplink node, checking a Do Not Flush (DNF) bit of the protection switching message; and at the uplink node, flushing, if the DNF bit has been reset, a Filtering DataBase (FDB).

The method may further include: at the uplink node, setting the DNF bit of the protection switching message; and at the uplink node, transmitting the protection switching message whose DNF bit has been set to a next node.

The flushing of the FDB may include flushing only an address corresponding to a port through which the protection switching message has been received, from the FDB.

In another general aspect, there is provided a method for protection switching in an Ethernet ring network, including: at a node where one or more subscriber ports are separated from one or more ring ports, the node on the Ethernet ring network, receiving a data packet; at the node, detecting a destination to which the data packet has to be transmitted; and transmitting, if no destination to which the data packet has to be transmitted is found, the data packet through a predetermined port.

The predetermined port may be a ring port.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
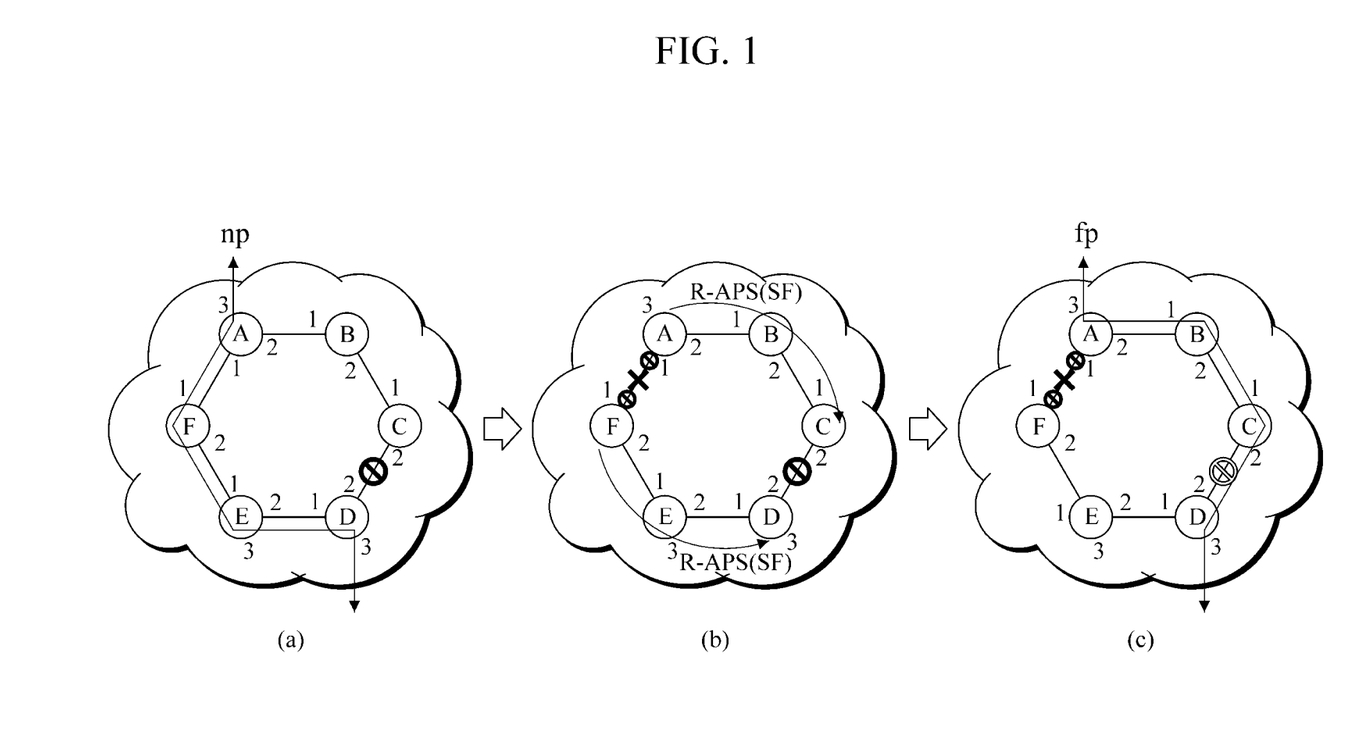
FIG. 1 is a view for explaining an example of a method for protection switching in a general Ethernet ring network.

FIG. 1 is a view for explaining an example of a method for protection switching in a general Ethernet ring network. Hereinafter, a method for protection switching when failure has occurred at a specific link, which is performed in a general G.8032 Ethernet protection system, will be described with reference to FIG. 1. In FIG. 1, (a) illustrates an Ethernet ring in a normal state, (b) illustrates an Ethernet ring in which failure has occurred at a specific link, and (c) illustrates an Ethernet ring reconfigured after protection switching.

Generally, the G.8032 Ethernet protection system allows no loop of Ethernet rings. Accordingly, in the normal state as illustrated in (a) of FIG. 1, the G.8032 Ethernet protection system defines a logically blocked link called a Ring Protection Link (RPL) to logically block RPL ports. Also, the G.8032 Ethernet protection system defines one of nodes adjacent to the RPL link as an RPL owner node. Referring to (a) of FIG. 1, the link between nodes C and D is an RPL and one of the nodes C and D is an RPL owner node. In the current example, it is assumed that the node C is an RPL owner node.

The RPL owner node C periodically transmits a control message to a ring to which the RPL owner node C belongs to inform that the network is in the normal state, and the individual nodes A, B, C, D, E and F create Filtering DataBases (FDBs) which are forwarding tables suitable for a phase configured with the blocked RPL ports to thereby configure a forwarding path np.

If failure has occurred at a specific link, the blocked RPL ports are unblocked and FDB information suitable for the changed network phase is reconfigured. Referring to (b) of FIG. 1, when failure has occurred at the link between the nodes A and F, nodes (that is, A and F) adjacent to the failed link block their failed ports (that is, port 1 of the node A and port 1 of the node F) and transmit protection switching messages, that is, Signal Failure (SF) messages to the neighboring nodes. Here, the SF messages may be transmitted to the neighboring nodes through ports (that is, port 2 of the node A and port 2 of the node F) that are located in the opposite side of the failed ports.

Referring to (c) of FIG. 1, the nodes B, C, E, and D, which have received the SF messages, flush their own FDB information, and the RPL owner node C unblocks the blocked RPL ports (that is, port 2 of the node C and port 2 of the node D). Then, the nodes B, C, E, and D collect forwarding information suitable for a new phase using MAC Source Address Learning Mechanism to create FDBs, and then configure a new forwarding path fp.

However, since a general Ethernet protection switching method flushes, when failure has occurred at a certain link, FDBs of all nodes never considering whether or not the failed link influences the network, a traffic overshoot may be caused. Accordingly, in order to overcome such an overshoot problem, a new protection switching method has been developed, which will be described below.

Figure 2:
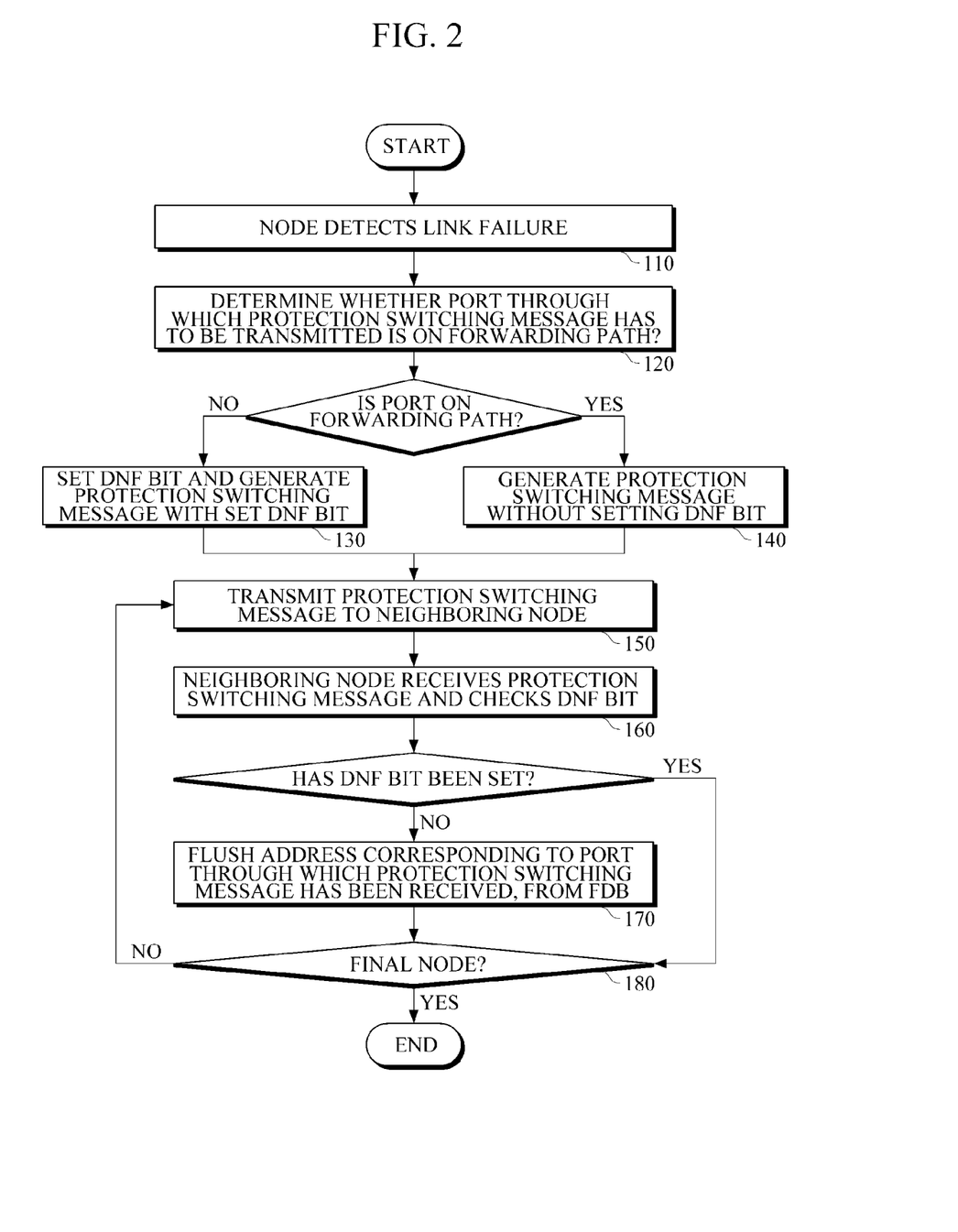
FIG. 2 is a flowchart illustrating an example of a protection switching method.
Figure 3:
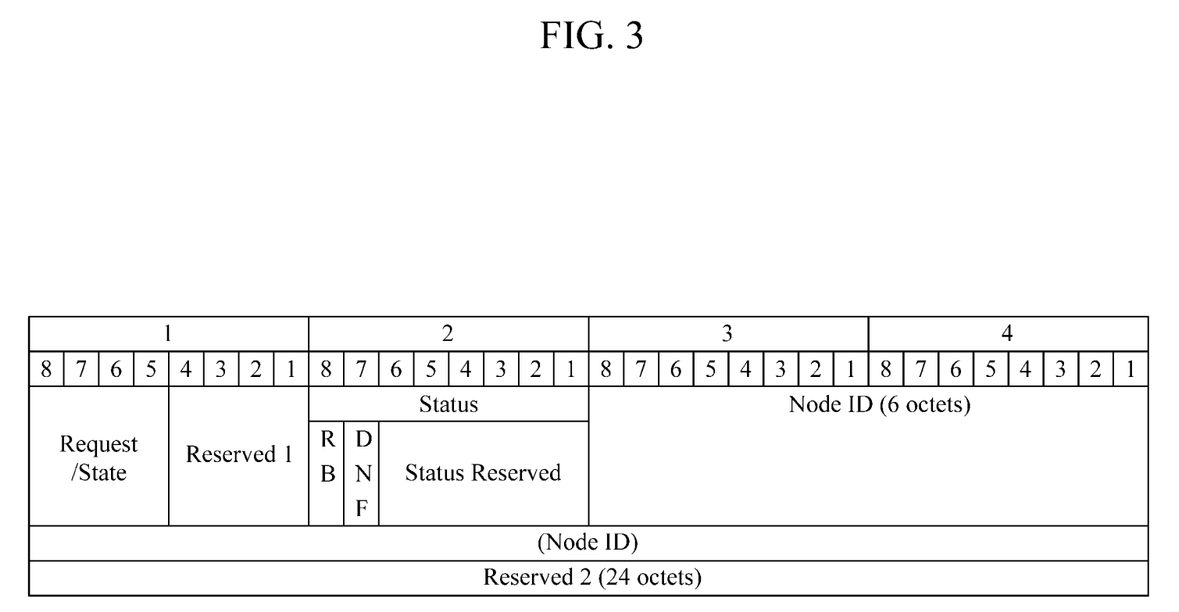
FIG. 3 shows an example of a protection switching message.

FIG. 2 is a flowchart illustrating an example of a protection switching method, and FIG. 3 shows an example of a protection switching message. The protection switching method according to the current example determines whether or not a failed link on an Ethernet network influences forwarding of the Ethernet network, and provides an appropriate FDB flushing method based on the results of the determination.

Hereinafter, the protection switching method will be described in detail with reference to FIGS. 1, 2, and 3.

First, when failure has occurred at a specific link in an Ethernet network, nodes (hereinafter, referred to as first nodes) adjacent to the failed node may detect the link failure (110). Referring to (b) of FIG. 1, since the failed link is the link between the nodes A and F, the first nodes correspond to the nodes A and F, and the first nodes A and F may detect a link connected to their ports 1 as the failed link.

Then, the first nodes A and F may determine whether ports through which will transfer protection switching messages to the neighboring nodes are on a forwarding path (120). In detail, if the first nodes A and F determine that failure has occurred at a link connected to their ports 1, the first nodes A and F generate protection switching messages, respectively, and transmit the protection switching messages to the neighboring nodes B and E, respectively, through the ports 2. At this time, the first nodes A and F may determine whether the ports 2 are on forwarding paths. For example, the first nodes A and F may check their own FDBs to determine whether the ports 2 are on forwarding paths. Referring again to (a) of FIG. 1, it is seen that the port 2 of the first node F is on a forwarding path, and the port 2 of the first node A is out of a forwarding path.

Then, the first nodes A and F generate protection switching messages based on the results of the determination. That is, since the first node A determines that its port 2 is out of a forwarding path, the first node A may generate a protection switching message for flushing no FDB (130), whereas since the first node F determines that its port 2 is on a forwarding path, the first node F may generate a protection switching message for flushing FDBs (140).

According to another aspect, the first node A may generate a protection switching message whose DNF bit (see FIG. 3) has been set such that nodes having received the protection switching message from the first node A do not flush their FDBs (130). Meanwhile, the first node F may generate a protection switching message whose DFN bit has been reset such that nodes having received the protection switching message from the first node F flush their FDBs (140).

Hereinafter, an example of a protection switching message defined in the G.8032 will be schematically described with reference to FIG. 3. Referring to FIG. 3, Request/Status consists of 4 bits. For example, "1011" may represent SF and "0000" may represent NR. Also, a RB bit of Status is used by an RPL owner node and set when an RPL is blocked. A DNF bit of Status is set when FDBs do not need to be flushed. Here, the DNF bit may have logic values of "True" and "False". If the DNF bit is set, the DNF bit has a "True" value, and if the DNF bit is reset, the DNF value has a "False" value. Node ID is a MAC address of a message source node.

Then, the first nodes A and F may transfer the protection switching messages to the neighboring nodes, respectively (150). That is, the first node A transmits the protection switching message to the neighboring node B and the first node F transmits the protection switching message to the neighboring node E.

Next, the neighboring nodes B and E check the DNF bits of the protection switching messages, respectively (160). According to the results of the checking, the node B neighboring the first node A does not flush its own FDB since the DNF bit of the received protection switching message has been set, and the node E neighboring the first node F flushes its own FDB since the DNF bit of the received protection switching message has been reset (170).

At this time, the node E may flush only MAC addresses corresponding to a port through which the node E has received the protection switching message. That is, the node E may flush only a transmission address list corresponding to the port 1 through which the protection switching message has been received. At this time, the node E may flush its FDB in a predetermined hardware manner.

Flushing a plurality of FDBs is aiming at changing traffic forwarding paths. However, there is a problem that it takes a relatively long time to check a FDB list that is managed by software and to flush a FDB of hardware for each item for software to individually delete the corresponding items. Accordingly, in the current example, by at once deleting a specific FDB item group from hardware, a total time consumed for flushing may be reduced.

Then, each neighboring node which has received the protection switching message may check whether there is a node to which the protection switching message has to be transmitted (180), and transmit, if a node to which the protection switching message has to be transmitted is found, the protection switching message to the corresponding node. Thereafter, the process after the operation 150 is repeated.

Figure 4:
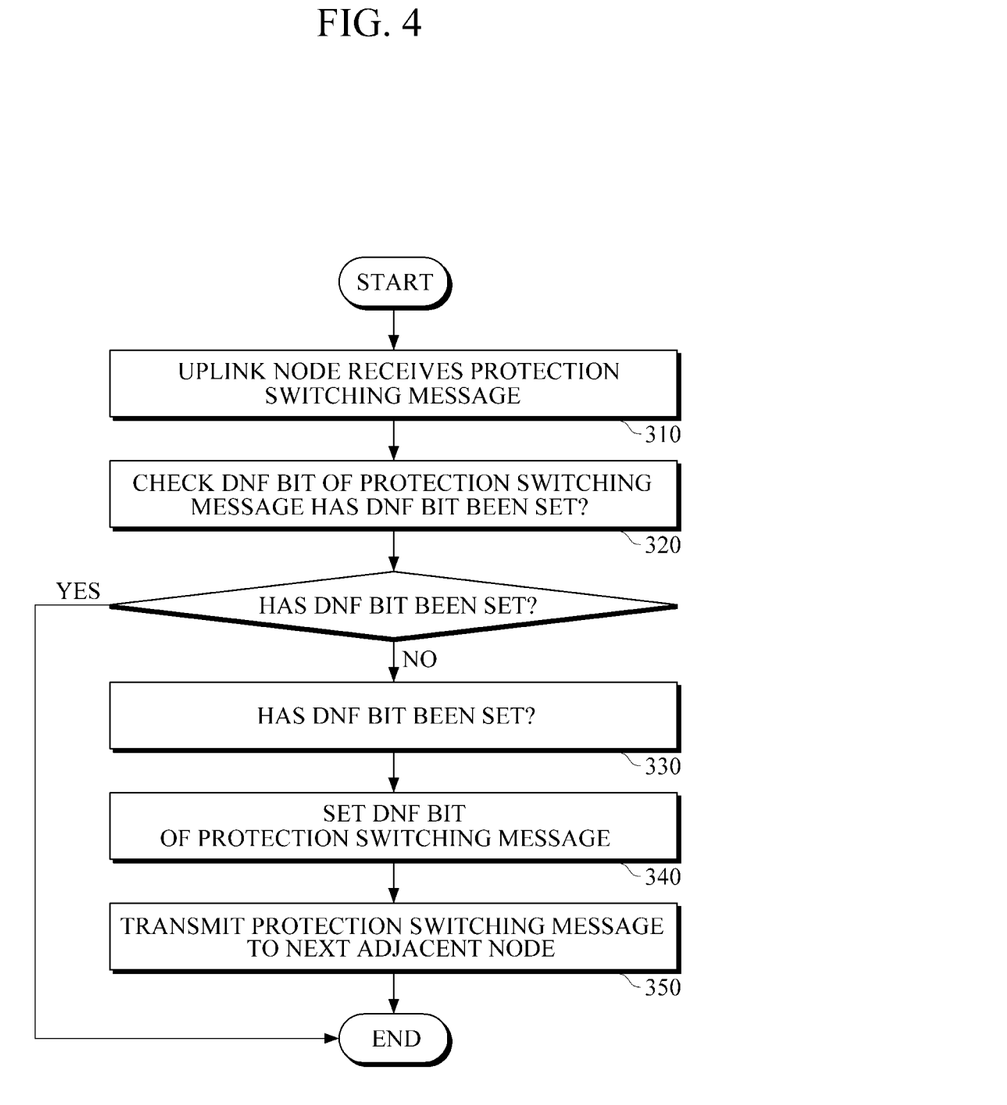
FIG. 4 is a flowchart illustrating another example of a protection switching method.

FIG. 4 is a flowchart illustrating another example of a protection switching method. An uplink may be defined on an Ethernet ring network. In this case, referring to FIG. 4, an uplink node receives two protection switching messages from its neighboring nodes (310), and each protection switching message is transmitted to the opposite neighboring node across the uplink node. Accordingly, since each node receives two protection switching messages across the uplink node, there is a problem that FDB flushing has to be performed twice.

Accordingly, if the uplink node receives the protection switching messages from its neighboring nodes, the uplink node checks the DNF bits of the protection switching messages (320), and flushes its own FDB if determining that the DNF bits have been reset (330). At this time, as described above, the uplink node may flush only an address list corresponding to a port through which the protection switching messages have been received, from the FDB.

Then, the uplink node sets the DNF bits (340), and transmits the resultant protection switching messages to the neighboring nodes (350).

The process may be performed whenever the uplink node receives each protection switching message.

The neighboring nodes that have received the protection switching messages from the uplink node check the DNF bits to determine whether FDB flushing has to be performed. In this case, since the DNF bits have been set in advance, FDB flushing will be no longer performed.

Figure 5:
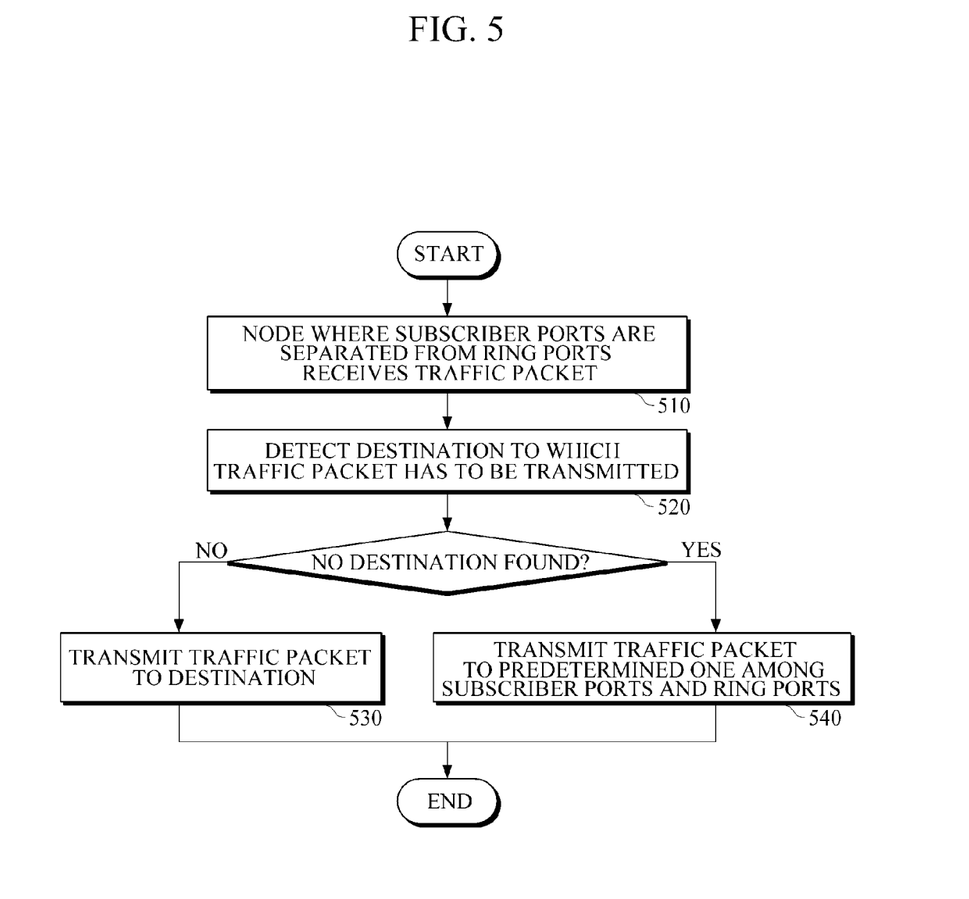
FIG. 5 is a flowchart illustrating another example of a protection switching method.
Figure 6:
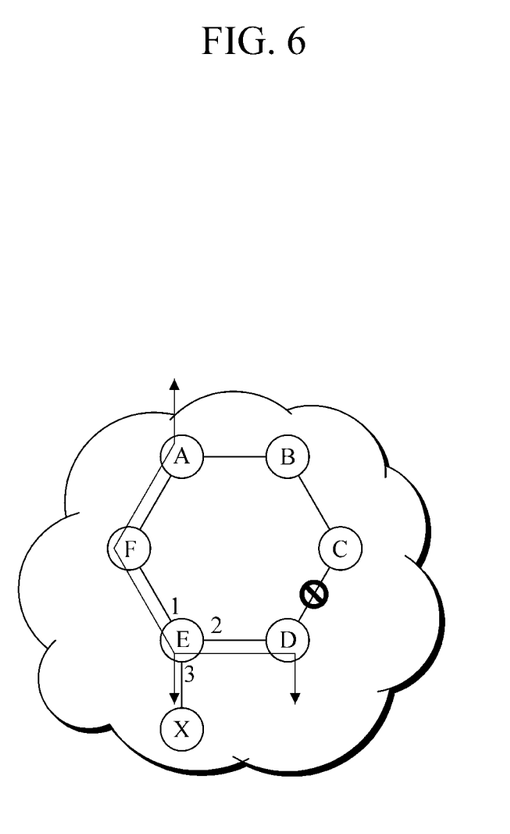
FIG. 6 illustrates an example of an Ethernet ring in which the protection switching method of FIG. 5 is performed.

FIG. 5 is a flowchart illustrating another example of a protection switching method, and FIG. 6 illustrates an example of an Ethernet ring in which the protection switching method of FIG. 5 is performed.

Another example of a protection switching method will be described with reference to FIGS. 5 and 6, below.

Generally, each node belonging to an Ethernet ring network has its own FDB, and checks a destination address of a received data packet to decide a port to which the data packet has to be transmitted using the FDB. If the node fails to decide a port to which the received data packet has to be transmitted using the FDB, the node transmits the packet through all ports so that all the nodes can process the packet. In this case, specific nodes where subscriber ports are separated from ring ports may add load to subscribers since data packets having no destination are transmitted through the subscriber ports.

Referring to FIGS. 5 and 6, in the case of a node E where a subscriber port 3 is separated from ring ports 1 and 2, if the node E receives a data packet from a node F through the port 1 (510), the node E may use a destination address of the data packet to decide a port through which the data packet has to be transmitted through a FDB (520).

If the node E decides a port through which the data packet has to be transmitted, the node E transmits the data packet through the decided port (530). If the node E fails to decide a port through which the data packet has to be transmitted, the node E may transmit the data packet through a predetermined port among the subscriber port and ring ports (540).

The predetermined port may be a ring port. This is because it is more appropriate probabilistically that each node where subscriber ports are separated from ring ports transmits a data packet having no destination address to a next node connected to a ring port under the premise that the node knows its own subscribers.

However, this is only exemplary, and the predetermined port may be decided arbitrarily by a network designer or manager or according to various statistical data, etc.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for protection switching in an Ethernet ring network, comprising:

at a first node on the Ethernet ring network, detecting link failure;

at the first node, determining whether a port through which a protection switching message has to be transmitted is on a forwarding path; and at the first node, generating a protection switching message based on the result of the determination; and at the first node, transmitting the protection switching message, wherein the generating of the protection switching message sets a Do Not Flush (DNF) bit of the protection switching message if the link failure occurs in a link that is included within the forwarding path and the port through which the protection switching message has to be transmitted is not on the forwarding path, wherein a value of the DNF bit determines whether a Filtering DataBase is flushed.

2. The method of claim 1, further comprising:

at a second node on the Ethernet ring network, receiving the protection switching message;

at the second node, checking the DNF bit of the protection switching message; and at the second node, flushing, if the DNF bit has been reset, the Filtering DataBase (FDB).

3. The method of claim 2, wherein the flushing of the FDB comprises flushing only an address corresponding to a port through which the protection switching message has been received, from the FDB.

4. The method of claim 2, wherein the flushing of the FDB flushes the FDB in a predetermined hardware manner.

5. The method of claim 1, further comprising:

at an uplink node, receiving the protection switching message;

at the uplink node, checking a Do Not Flush (DNF) bit of the protection switching message; and at the uplink node, flushing, if the DNF bit has been reset, the Filtering DataBase (FDB).

6. The method of claim 5, further comprising:

at the uplink node, setting the DNF bit of the protection switching message; and at the uplink node, transmitting the protection switching message whose DNF bit has been set to a next node.

7. The method of claim 5, wherein the flushing of the FDB comprises flushing only an address corresponding to a port through which the protection switching message has been received, from the FDB.

* * * * *